US009568588B2

(12) United States Patent
Jones et al.

(10) Patent No.: US 9,568,588 B2
(45) Date of Patent: Feb. 14, 2017

(54) GEOLOCATION OF WIRELESS ACCESS POINTS FOR WIRELESS PLATFORMS

(75) Inventors: Eric B. Jones, Westmont, NJ (US); Kenneth R. Good, Odenton, MD (US); Kyle J. Roach, Hanover, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 1305 days.

(21) Appl. No.: 13/273,825

(22) Filed: Oct. 14, 2011

(65) Prior Publication Data

US 2013/0093628 A1  Apr. 18, 2013

(51) Int. Cl.
*G01S 3/02*  (2006.01)
*G01S 5/14*  (2006.01)
*G01S 5/06*  (2006.01)
*G01S 11/06*  (2006.01)
*G01S 13/46*  (2006.01)
*G01S 5/04*  (2006.01)

(52) U.S. Cl.
CPC .. *G01S 5/14* (2013.01); *G01S 5/06* (2013.01); *G01S 11/06* (2013.01); *G01S 5/04* (2013.01); *G01S 2013/466* (2013.01); *G01S 2013/468* (2013.01)

(58) Field of Classification Search
CPC ............. G01S 5/14; G01S 5/06; G01S 5/12; G01S 5/04; G01S 5/0252; G01S 5/021; G01S 2013/466; G01S 2013/468
USPC ................. 342/450, 451, 126, 145
See application file for complete search history.

(56) References Cited

U.S. PATENT DOCUMENTS

| 3,518,674 | A | 2/1969 | Moorehead et al. |
| 3,886,553 | A | 5/1975 | Bates |
| 6,249,252 | B1 | 6/2001 | Dupray |
| 6,861,982 | B2 * | 3/2005 | Forstrom ............. G01C 21/206 342/387 |
| 6,865,395 | B2 * | 3/2005 | Riley .................... G01S 5/0252 342/464 |
| 7,176,831 | B2 * | 2/2007 | Dibble et al. ............ 342/357.48 |

(Continued)

OTHER PUBLICATIONS

"Node Positioning in ZigBee Network Using Trilateration Method Based on the Received Signal Strength Indicator (RSSI)"; Ret al.; European Journal of Scientific Research; ISSN 1450-216X; vol. 46 No. 1 (2010), pp. 048-061; © EuroJournals Publishing, Inc. 2010 http://www.eurojournals.com/ejsr.htm.*

(Continued)

*Primary Examiner* — Jack W Keith
*Assistant Examiner* — Chuong P Nguyen
(74) *Attorney, Agent, or Firm* — Ronald E. Prass, Jr.; Prass LLP

(57) ABSTRACT

A system and method for using a receiving wireless device to passively detect target wireless devices or access points, quantify signal strengths of the target wireless devices or access points, and accurately identify a position for, or geolocate, the target wireless devices or access points. A position of the receiving wireless device is determined and correlated with a signal strength received from a target wireless device taken from multiple positions of the receiving wireless device. A trilateration algorithm is applied to the correlated date to obtain coarse geographic positions for the target wireless device, then a filtering algorithm is applied to obtain an accurate position for the target wireless device, which is in turn displayed to a user of the receiving wireless device.

20 Claims, 3 Drawing Sheets

(56) References Cited

U.S. PATENT DOCUMENTS

| | | | |
|---|---|---|---|
| 7,319,878 B2 | 1/2008 | Sheynblat et al. | |
| 7,403,762 B2* | 7/2008 | Morgan et al. | 455/404.2 |
| 7,580,450 B2* | 8/2009 | Stein | G01S 5/0215 |
| | | | 375/150 |
| 7,616,155 B2* | 11/2009 | Bull et al. | 342/387 |
| 7,683,835 B2 | 3/2010 | Sharma | |
| 7,916,085 B2* | 3/2011 | Kimball | 342/451 |
| 8,478,292 B2* | 7/2013 | Kim | G01S 5/14 |
| | | | 342/451 |
| 8,723,730 B2* | 5/2014 | Lu et al. | 342/464 |
| 9,144,055 B2* | 9/2015 | Sun | H04W 64/003 |
| 2004/0137912 A1* | 7/2004 | Lin | H04W 64/00 |
| | | | 455/456.1 |
| 2008/0227469 A1 | 9/2008 | Burgess et al. | |
| 2008/0242310 A1 | 10/2008 | Vassilovski | |
| 2010/0138184 A1* | 6/2010 | Fernandez et al. | 702/150 |
| 2011/0164690 A1 | 7/2011 | Ramesh et al. | |

OTHER PUBLICATIONS

"Indoor Location Tracking Using Received Signal Strength Indicator"; Chuan-Chin Pu, Chuan-Hsian Pu and Hoon-Jae Lee; Book "Emerging Communications for Wireless Sensor Networks", Published: Feb. 7, 2011.*

"A practical path loss model for indoor WiFi positioning enhancement"; Atreyi Bose and Chuan Heng Foh; Published in: Information, Communications & Signal Processing, 2007 6th International Conference on; Date of Conference: Dec. 10-13, 2007; pp. 1-5.*

\* cited by examiner

GEOLOCATION OF WIRELESS ACCESS POINTS FOR WIRELESS PLATFORMS

BACKGROUND

1. Field of the Disclosed Embodiments

This disclosure relates to systems and methods for passively identifying positions of wireless devices, also referred to as geolocation.

2. Related Art

With the increasingly widespread proliferation of wireless devices accessing all manner of wireless networks, there has emerged a need for entities other than the particular user of a wireless device to accurately pinpoint a position of the wireless device. Accurate geolocation of a particular wireless device has, however, emerged as a problem for those involved in wireless research to overcome.

Research to date has produced partial solutions to the problem. For example, in order to obtain highly accurate geolocation results for wireless devices in open areas, highly-specialized equipment has been developed. This equipment is often cumbersome and expensive. The effectiveness of this equipment is, however, significantly adversely impacted when confronted with physical variables that emerge in other than open areas. These variables include signal reflection, variable power transmitters, and signal degradation due to walls and other objects shielding the signal from the wireless device.

Less sophisticated conventional solutions tend to be even less accurate. Accuracy can be increased using expensive antenna equipment, such as phased-array antennas, and detailed algorithms that make use of line-of-bearing concepts. But again, these solutions are cumbersome, and the expense associated with these solutions increases sharply as a desired level of accuracy increases.

Also, conventional geolocation systems often rely heavily upon connection to extensive external databases to facilitate looking up latitude and longitude coordinates for "known" locations in these databases. Such systems include SkyHook® or Wireless Geographic Logging Engine (WiGLE®). While systems such as these can provide accurate results, these systems require users manually adding information regarding access points to the huge databases. For example, WiGLE.net reports that the site has been "[m]aking maps since 2001," with over 45 million located Wi-Fi networks as of October 2011. These databases are populated in advance, often by users "wardriving" neighborhoods. Wardriving is typically understood to refer to the act of searching for Wi-Fi wireless networks by users in moving vehicles, using portable computers or PDAs. These users then mass upload data on coarse locations of wireless access points to the databases. This process provides data that is often inaccurate and is, otherwise, unlikely to find certain access points such as a corporate access points, or newly-installed access points. Complex algorithms then comb the databases in an effort to resolve accuracy for the detected Wi-Fi access points.

SUMMARY OF THE DISCLOSED EMBODIMENTS

It would be advantageous to provide a system and a method that would provide a user with a simple, portable, passive and local geolocation capability for detecting and accurately geolocating one or more target remote wireless devices. These systems and methods obviate the requirement for use of highly-specialized equipment, or otherwise access to extensive databases.

In various exemplary embodiments, the systems and methods according to this disclosure may provide a simple solution for geolocation of a target remote wireless device performed completely and autonomously on a user's local wireless-enabled device, such as a commercially-available smartphone, tablet, PDA or the like.

In various exemplary embodiments, the systems and methods according to this disclosure may provide external entities and agencies with a capability to accurately geolocate target remote wireless devices. Law enforcement and other government agencies, security professionals and penetration testers may, for example, be provided with a passive and discreet capability by which to locate unknown, rogue, or unauthorized wireless devices. Commercial vendors may employ the systems and methods according to this disclosure to better advise users of the vendors' proprietary devices of more ideal locations to improve wireless reception on the users' wireless devices.

In various exemplary embodiments, the systems and methods according to this disclosure may use a Global Positioning System (GPS) receiver, which is common on most wireless devices, such as smartphones and tablets, and the wireless (Wi-Fi) receiver on a user's local wireless device to passively detect and geolocate the target remote wireless device. The systems and methods according to this disclosure use the received signal strength from the target remote wireless device, GPS coordinates of the user's own local wireless device and algorithms that can be stored and processed in the user's own local wireless device to accurately geolocate the target remote wireless device. Employing this combination of receivers in the user's own local wireless device, periodic readings may be taken to locate remote wireless devices in the area of the user's local wireless device, including Wi-Fi access points. Signal strength (Received Signal Strength Indication or RSSI) for the located remote wireless devices may be measured. GPS coordinates for the location of the user's own local wireless device may be recorded and stored locally in the user's own local wireless device for each periodic reading. Information identifying a particular detected target remote wireless device may also be stored in association with the own device location information for each periodic reading.

In various exemplary embodiments of the systems and methods according to this disclosure, the user's own local wireless device may then execute a trilateration algorithm on the stored data to resolve a number of candidate sets of possible GPS coordinates for a particular target remote wireless device. The trilateration algorithm may be used in conjunction with a path loss model to predict the location of the particular target remote wireless device.

In various exemplary embodiments, the systems and methods according to this disclosure may then apply a filtering algorithm in the user's own local wireless device. The filtering algorithm is applied to narrow the resolved number of candidate sets of possible GPS coordinates to a single set of GPS coordinates that represents a best approximation of a geographic position of the particular target remote wireless device.

In various exemplary embodiments, the systems and methods according to this disclosure may provide a simple solution to the geolocation problem for specific target remote wireless devices. An advantage of the systems and methods according to this disclosure is that the disclosed passive wireless geolocation means that the user of the own local wireless device can detect and geolocate one or more target remote wireless devices without interrogating those devices directly. In this manner, the one or more target remote wireless devices, and the networks within which those devices may be operating, are not being probed. The systems and methods according to this disclosure are capable of being implemented on most off-the-shelf wireless hand-held devices, including, but not limited to smartphones, tablets and PDAs having a GPS receiver and a wireless (Wi-Fi) receiver.

In various exemplary embodiments, the systems and methods according to this disclosure do not require specialized equipment or antenna arrays. The simplicity of the systems and methods according to this disclosure is their ability to be implemented on virtually any commercially-available hand-held device that includes at least built-in GPS and Wi-Fi receivers. The systems and methods according to this disclosure contemplate use in conjunction with other own system navigation capabilities in a user's own local wireless device, such as, for example, an inertial navigation system in instances where GPS navigation is not enabled, or is otherwise unavailable.

The systems and methods according to this disclosure present a solution that resolves a position of a target remote wireless device in near real time locally, with no need, for example, to consult any external databases or otherwise communicate separately with any information exchange.

The systems and methods according to this disclosure can also be used on a pre-surveyed log file that is loaded into the user's own local wireless device to further aid in resolving accurate positions of target remote wireless devices.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for identifying positions of target remote wireless devices using only a user's own local wireless device will be described, in detail, with reference to the following drawings, in which.

DETAILED DESCRIPTION OF THE DISCLOSED EMBODIMENTS

The systems and methods for providing accurate geolocation of a target remote wireless device according to this disclosure will generally refer to this specific utility for those systems and methods. Exemplary embodiments described and depicted in this disclosure should not be interpreted as being specifically limited to any particular configuration, or directed to any particular intended use. In fact, any detection and localization methodology for a wireless device that may benefit from the systems and methods according to this disclosure is contemplated.

Specific reference to, for example, any particular wireless device should be understood as being exemplary only, and not limited, in any manner, to any particular class of devices. The systems and methods according to this disclosure will be described as being particularly adaptable to being hosted on commercially-available hand-held wireless devices such as smartphones, tablets, PDAs and the like, but should not be considered as being limited to only these devices.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements and combinations of those elements as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to a system and a method for accurately and passively identifying a position of, or "geolocating," one or more target remote wireless devices, particularly employing a user's own local wireless device. The user's own local wireless device is autonomously employed for signal detection, position localization, and resolution of an accurately-identified position for the one or more target remote wireless devices using algorithms stored in, or executed by, the user's own local wireless device, as well as a corresponding computer-readable medium.

The disclosed embodiments may be advantageously operated in a local computing environment. In this regard, a user's own local wireless device may be operated within the local computing environment.

Figure 1:
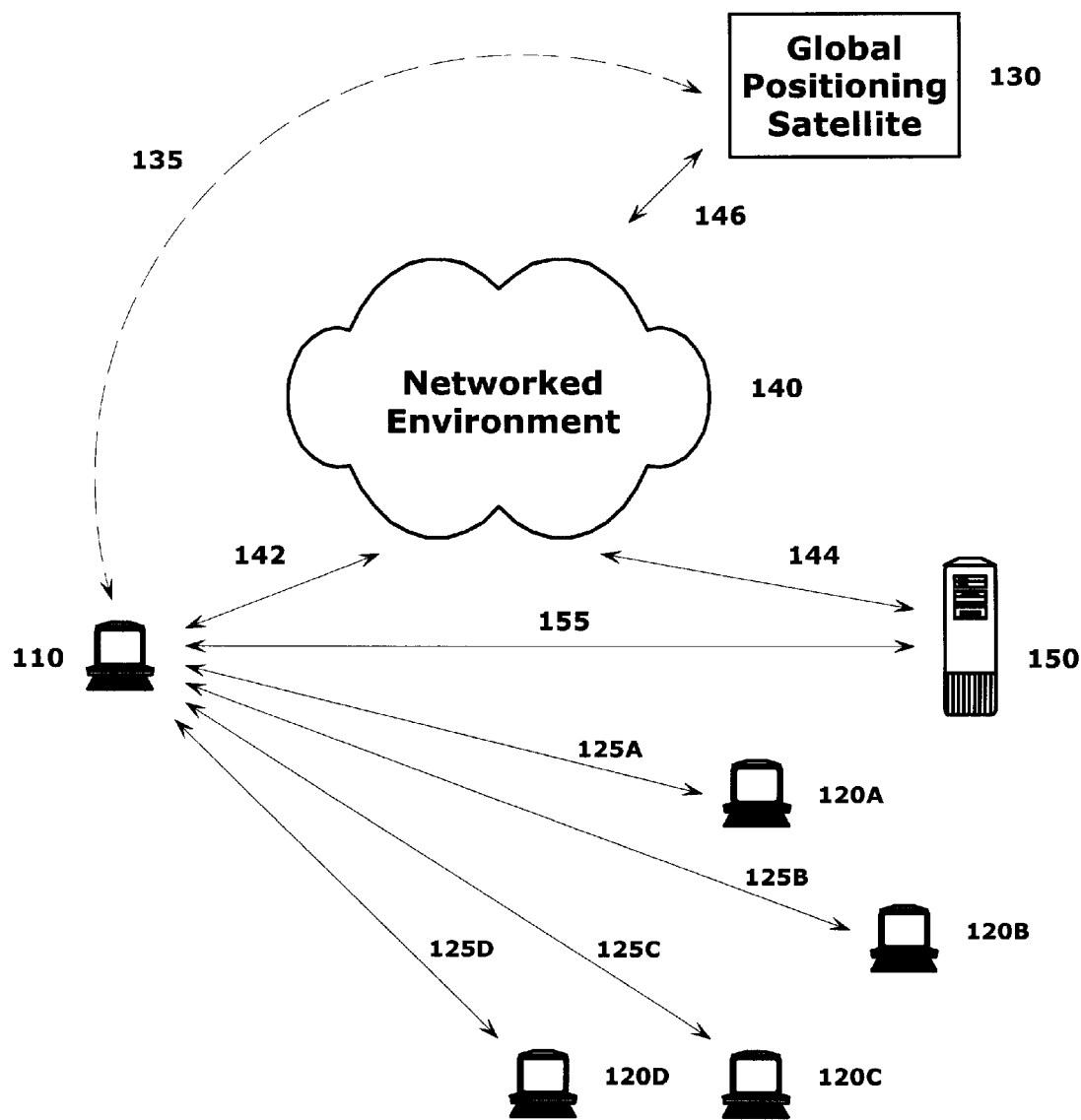
FIG. 1 illustrates a schematic diagram of an exemplary wireless network within which the systems and methods according to this disclosure may operate.

FIG. 1 illustrates a schematic diagram of an exemplary network environment that is representative of a local computing environment within which the systems and methods according this disclosure may operate. As shown in FIG. 1, a user's own local wireless device 110 may be provided to communicate with all of the other elements throughout the exemplary network environment. For example, the user's own local wireless device 110 may communicate directly with a plurality of wireless access points or remote wireless devices as candidate target remote wireless devices 120A-120D over direct communication paths, depicted in FIG. 1 as communication lines 125A-125D. The user's own local wireless device 110 may constantly or periodically update its own geographic position with reference to, for example, a global positioning satellite (GPS) system 130. Alternatively, when GPS is not enabled or unavailable the user's own local wireless device 110 may compute its own geographic position by other available means such as, for example, through use of an internal inertial system. Communications between the user's own local wireless device 110 and the GPS system 130 may be direct via an exemplary communications link 135, such as that depicted in FIG. 1. The GPS system may separately communicate with the networked environment 140 via a communication link 146.

The user's own local wireless device 110 may also communicate with a remote server 150. The remote server 150 may provide additional data storage capacity for storing data, or for otherwise storing and hosting system operating programs, or the like, which may be accessed and executed by the user's own local wireless device 110. Communication with the remote server 150 may be direct via, for example, direct communications link 150, as shown in FIG. 1, or may be via multiple communications links 142/144 passing through the networked environment 140.

As will be discussed in detail below, once the user's own local wireless device 110 resolves an accurate geographic location of one or more of the candidate target remote wireless devices 120A-120D, using either algorithms executed locally in the user's own wireless device 110, autonomously or through some communication with server 150, the user's own local wireless device 110 may communicate the resultant geographic position of one or more of the target remote wireless devices 120A-120D to the server 150 to then populate a database of geographic locations of target remote wireless devices, or to any other beneficial purpose.

Figure 2:
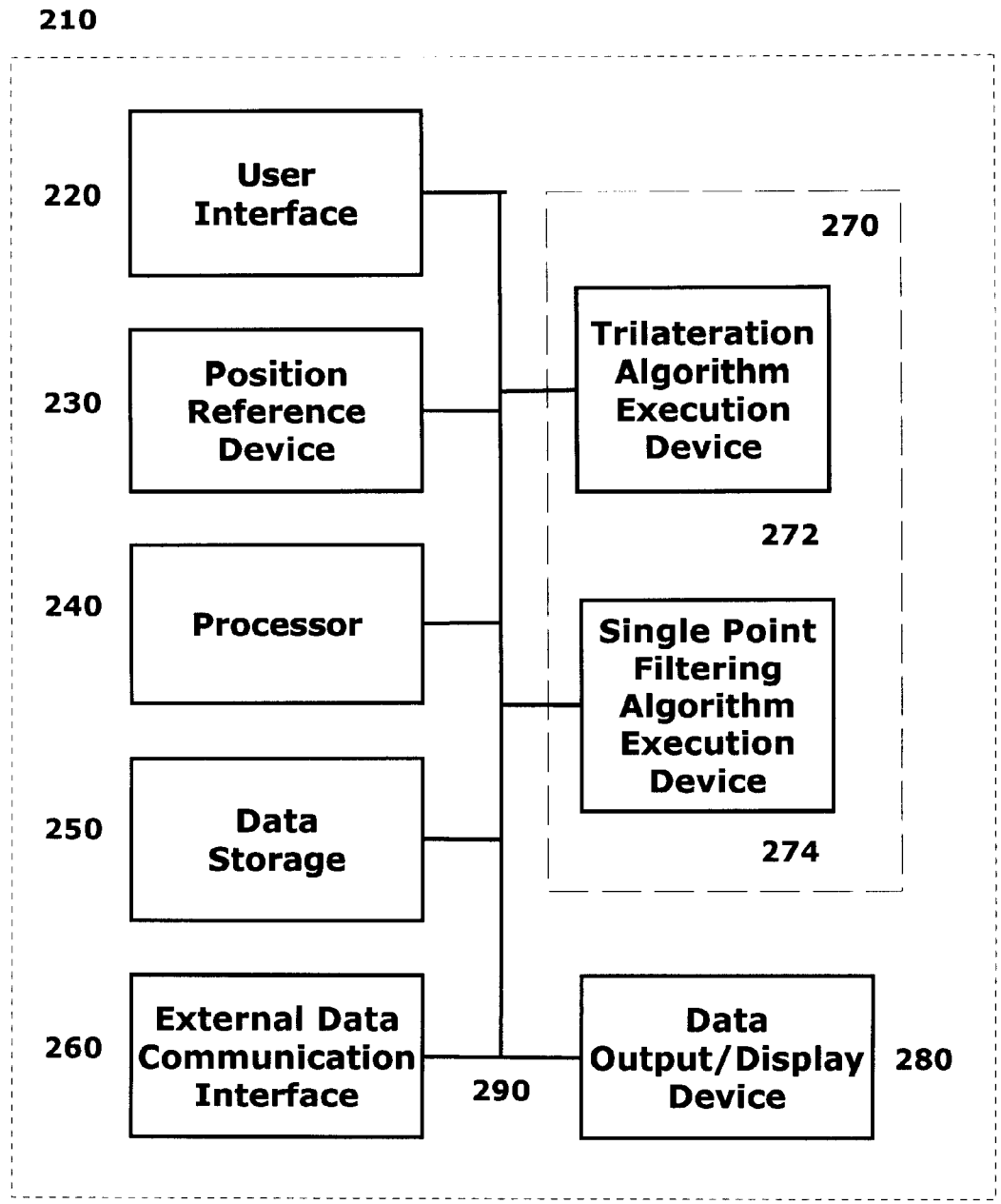
FIG. 2 illustrates a block diagram of an exemplary system for identifying a position of a target remote wireless device according to this disclosure.

FIG. 2 illustrates a block diagram of an exemplary system for identifying a position of a remote target wireless device according to this disclosure. The exemplary system 210 shown in FIG. 2 may be embodied in, for example, the user's own local wireless device 110, such as that discussed above with reference to FIG. 1. Otherwise, portions of the exemplary system 210 shown in FIG. 2 may be housed in a remote location, such as remote server 150 shown in FIG. 1, with which the user's own local wireless device 110 is in communication. An objective of the systems and methods according to this disclosure, however, is to house the data acquisition and processing in the user's own local wireless device 110, which may operate autonomously to perform these functions.

The system 210 may include a user interface 220 by which the user can communicate with the system 210. The user interface 220 may be configured as one or more conventional mechanisms that permit a user to input information to the system 210. The user interface 220 may include, for example, an integral or attached keyboard and/or mouse by which a user can enter data into the system 210. The user interface 220 may alternatively include (1) a touchscreen with "soft" buttons, or for use with a compatible stylus; (2) a microphone by which a user may provide oral commands to the system 210 to be "translated" by a voice recognition program or otherwise; or (3) other like devices for user operation of, and data exchange with, the system 210.

The system 210 may include one or more position reference devices 230. Such position reference devices 230 may comprise a GPS receiver for receiving global positioning satellite location information to the system 210, and/or may include an inertial navigation system or other like device that can localize the position of the system for use.

The system 210 may also include one or more local processors 240 for individually operating the system 210 and carrying out processing and control functions such as those that will be described in detail below. Processor(s) 240 may include at least one conventional processor or microprocessor that interprets and executes instructions to execute the algorithms and make the determinations according to the methods of this disclosure.

The system 210 may include one or more data storage devices 250. Such data storage devices 250 may be used to store data or operating programs to be used by the system 210, and specifically the processor 240. Data storage device(s) 250 may include a random access memory (RAM) or another type of dynamic storage device that stores information and instructions for execution by processor(s) 240. Data storage device(s) 250 may also include a read-only memory (ROM), which may include a conventional ROM device or another type of static storage device that stores static information and instructions for processor(s) 240. Further, the data storage devices 250 may be integral to the system 210, or may be provided external to, and in wired or wireless communication with, the system 210.

The system 210 may include one or more external data communication interfaces 260 by which the system 210 may communicate with components external to the system 210, such as those shown, for example, in FIG. 1. External data communication interface(s) 260 may include any mechanism that facilitates direct communication, or communication via a network environment, for the collection of data and the sharing of results of the processing undertaken by the system 210. For example, geolocating and identifying information associated with one or more target remote wireless devices may be transmitted from the system 210 by the one or more external data communication interfaces 260. As such, external data communication interfaces 260 may be appropriately configured and include such other mechanisms as may be appropriate for assisting in communications with other devices and/or systems.

One of the external data communication interfaces 260 may be configured as a Wi-Fi receiver usable to detect signals indicative of wireless devices and wireless device access points to localize candidate target remote wireless devices, and to particularly assess a signal strength, e.g., Received Signal Strength Indication or RSSI.

The system 210 may also include an algorithm storage and execution device 270 as a part of a processor 240 or as a separate component module or circuit in the system 210. The algorithm storage and execution device 270 may include at least a trilateration algorithm execution device 272 and a single point filtering algorithm execution device 274. As with all of the components of the system 210, the algorithm storage and execution device 270, with its trilateration algorithm execution device 272 and single point filtering algorithm execution device 274, is preferably housed locally in a user's own local wireless device, but portions of the algorithm storage and execution device 270 may be housed in a remote location such as, for example, in server 150 shown in FIG. 1. An objective of the systems and methods according to this disclosure remains, however, to house all of the required components for geolocation of a target remote wireless device integrally within the user's own local wireless device 110 (see FIG. 1).

Trilateration is the geometric process of determining absolute or relative locations of points by measuring distances using specifically the geometry of circles, spheres, and triangles. Trilateration is distinguishable from triangulation because it does not require the measurement of angles, as is required by triangulation. In a simple two-dimensional sense, when it is known that a point lies on two curves such as the boundaries of two circles, the circle centers and the radii provide sufficient information to narrow possible locations for one or more candidate target remote wireless device 120A-120D, as shown in FIG. 1. In a three-dimensional sense, the boundaries are expanded to be boundaries of spheres. In the disclosed concept, the user's own wireless device location represents the circle/sphere center, and values associated with the received signal strengths are indicative of the radii. Additional applications, such as a single point filtering algorithm, may narrow the positions down to a single unique position for the one or more target remote wireless devices.

Algorithms for executing trilateration and fine-grained single point filtering according to the systems and methods of this disclosure are known and will, therefore, not be discussed further.

The system 210 may include at least one data output/display device 280 which may be configured as one or more conventional mechanisms that output information to the user, including a display or one or more speakers for alerting a user to a resolved position of one or more target remote wireless devices. The data output/display device may separately be an output port for connection to a printer, a copier, a scanner, a multi-function device, or a remote storage medium, such as a memory in the form, for example, of a magnetic or optical disk with a corresponding disk drive.

All of the various components of the system 210, as depicted in FIG. 2, may be connected by one or more data/control busses 290. These data/control busses 290 may provide wired or wireless communication between the various components of the system 210, whether all of those components are housed integrally in, or are otherwise external and connected to, the user's own local wireless device.

It should be appreciated that, although depicted in FIG. 2 as an integral unit, the various disclosed elements of the system 210 may be arranged in any combination of subsystems as individual components or combinations of components, integral to a single unit, or external to, and in wired or wireless communication with the single unit of the system 210. In other words, no specific configuration as an integral unit or as a support unit is to be implied by the depiction in FIG. 2.

It should also be appreciated that the system storage and processing functions described above, given the proper inputs, may be carried out in system hardware circuits, software modules or instructions or firmware, or in varying combinations of these.

The disclosed embodiments may include a method for detecting wireless access points and for quantifying signal strengths of the wireless access points to accurately identify a position for, or to geolocate, one or more target remote wireless devices. The method may include determining a position of a user's own local wireless device. The method may correlate data on the user's own wireless device position with data from one or more candidate target remote wireless devices taken from multiple positions of the user's own local wireless device taken at periodic intervals. The method may then make a determination whether or not enough correlated data is available regarding a specific target remote wireless device for the method to proceed with resolving a coarse and then a fine geographic location for the specific target remote wireless device. If a determination is made that there is not enough correlated data to proceed with the internal computations in the user's own local wireless device, additional signals from the specific target remote wireless device and correlated positions for the user's own local wireless device may be collected. Once the method determines that sufficient correlated data is available, the method may proceed with applying a trilateration algorithm to obtain coarse geographic positions for the specific target remote wireless device. Once a coarse position or positions are resolved for the specific target remote wireless device, a filtering algorithm may be applied to obtain an accurate position for the specific target remote wireless device. The user's own local wireless device may then display, store and/or otherwise transmit, the accurate position data regarding the specific target remote wireless device.

Figure 3:
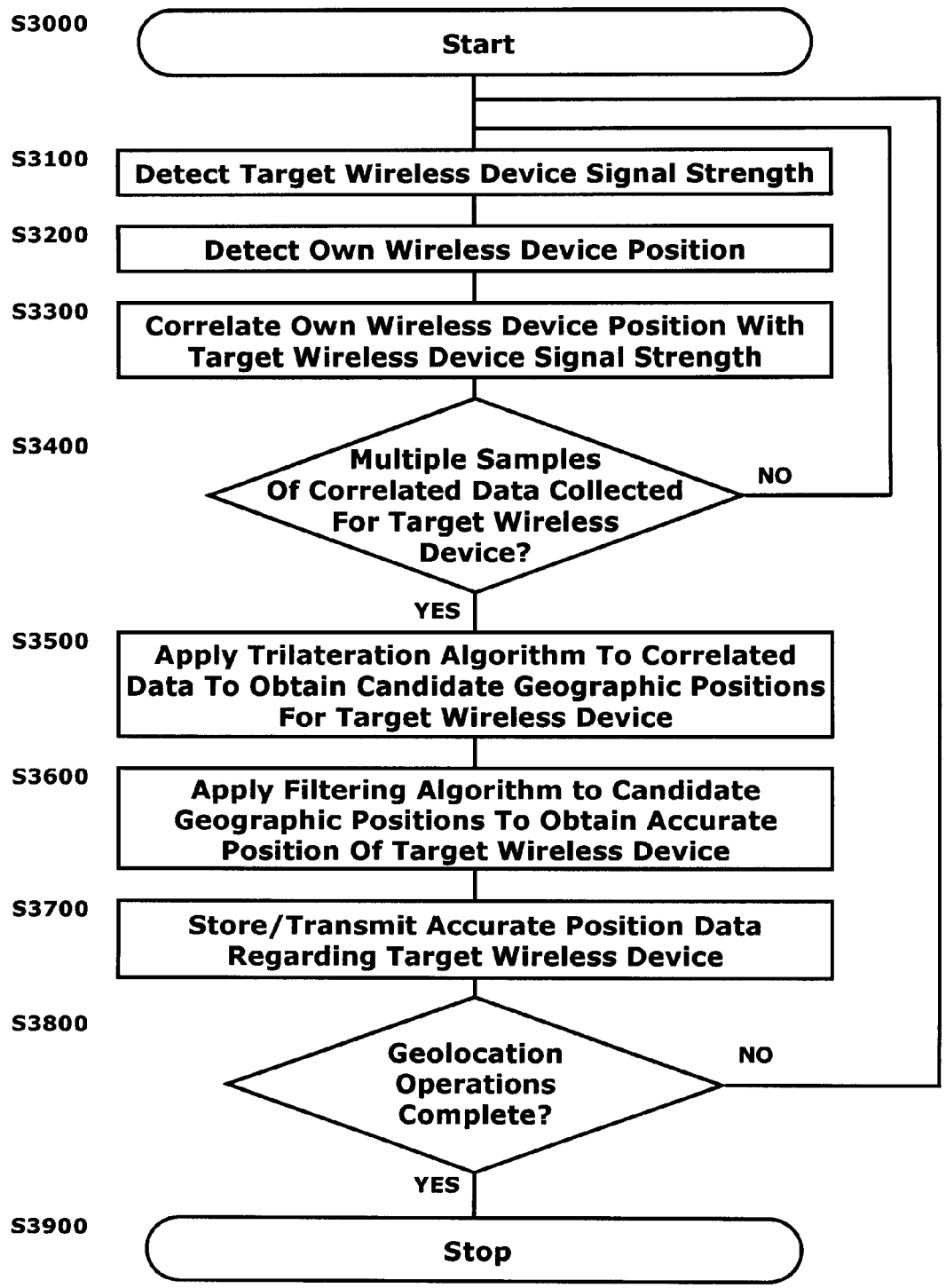
FIG. 3 illustrates a flowchart of an exemplary method for identifying a position of a target remote wireless device according to this disclosure.

FIG. 3 illustrates a flowchart of an exemplary method for identifying a position of a target remote wireless device according to this disclosure. As shown in FIG. 3, operation of the method commences at Step S3000 and proceeds to Step S3100.

In Step S3100, the method passively detects a signal from one or more target wireless devices using, for example, data received via a Wi-Fi receiver and an omni-directional antenna and assesses a signal strength or RSSI for candidate target remote wireless devices. Operation of the method proceeds to Step S3200.

In Step S3200, the method detects a position of a user's own local wireless device. Such detection may occur by accessing a GPS system, by referencing an inertial navigation system, or by other like means for localizing a position of a user's own local wireless device. Operation of the method proceeds to Step S3300.

In Step S3300, information regarding the candidate target remote wireless devices is correlated with location data for the user's own local wireless device. The correlated data may be the result of a number of detections and signal strength measurements, for example three or more, taken at routine or random intervals and at different locations with respect to a specific candidate target remote wireless device. Operation of the method proceeds to Step S3400.

Step S3400 is a determination step. In Step S3400, a determination is made regarding whether enough correlated data regarding the specific candidate target remote wireless devices and the user's own local wireless device is available to determine a coarse location for the specific candidate target remote wireless device.

If, in Step S3400, it is determined that there is not enough correlated data to proceed with, for example, a trilateration algorithm, operation of the method reverts to Step S3100 in order that more data in the form of signals and locations can be collected and correlated.

If, in Step S3400, it is determined that there is enough correlated data, operation of the method proceeds to Step S3500.

In Step S3500, a trilateration algorithm is applied according to known methods to the collected and correlated data regarding received signals from the specific candidate target remote wireless device, and locations of the user's own local wireless device where the signals were detected. The trilateration algorithm may apply values related to measured signal strengths received from the specific candidate target remote wireless device by the user's own local wireless device as measures of radii of spheres, and corresponding locations of the user's own local wireless device at which the signals were received as centers of the respective spheres for use in the trilateration algorithm. The values related to signal strength may be based on distances calculated using, for example, a log-distance path loss model and by testing ranges of path loss exponents. The trilateration algorithm may be applied to determine a plurality of candidate locations for the actual location of the specific candidate target remote wireless device. Operation of the method proceeds to Step S3600.

In Step S3600, the method, having arrived at a number of candidate locations for the actual location of the specific candidate target remote wireless device, may apply a single point filtering algorithm among the candidate locations to resolve an actual accurate location of the specific candidate target remote wireless device. This may be accomplished by, for example, resolving a location with a smallest predicted error on a single pass through the method, or otherwise, for example, by adding the location with the smallest predicted error on a given pass through the method to the list of candidate locations and running the candidate locations through the method additional times. Operation of the method proceeds to Step S3700.

In Step 3700, the method may locally store the derived location as the actual accurate location of the specific candidate target remote wireless device, along with identifying information regarding the specific candidate target remote wireless device, in the user's own local wireless device, or may store the derived location as another candidate location for another pass through the method. Otherwise, the method may alternatively transmit information regarding the derived location as the actual accurate location of the specific candidate target remote wireless device, along with the identifying information regarding the specific candidate target remote wireless device to be stored in other than the user's own local wireless device. Such storage may be at any suitable location in a network environment with which the user's own local wireless device communicates, including a remote server such as server 150 shown in FIG. 1. Operation of the method proceeds to Step S3800.

Step S3800 is a determination step. In Step S3800, a determination is made regarding whether the geolocation operations for the specific candidate target remote wireless device are complete, and/or whether accurate positions for other candidate target remote wireless devices are to be found.

If, in Step S3800, it is determined that geolocation operations are not complete, operation of the method reverts to Step S3100.

If, in Step S3800, it is determined that geolocation operations are complete, operation of the method proceeds to Step S3900 where operation of the method ceases.

The disclosed embodiments may include a non-transitory computer-readable medium storing instructions which, when executed by a processor, may cause the processor to execute the steps of a method including a step for detecting a wireless access point such as a target remote wireless device based on a signal emanating from that wireless access point and for measuring a signal strength or RSSI for the detected wireless access point. The method may include a step for determining a position of a user's own local wireless device by any available means. The method may then include a step for correlating data on the user's own device position with data on the target remote wireless device, including identifying data for the target remote wireless device and a value assigned to a signal strength received from the target remote wireless device. The method may then execute a step of making a determination whether or not enough correlated data is available regarding the target remote wireless device for the method to proceed with steps of resolving a coarse and then a fine geographic location for the target remote wireless device. If a determination is made that there is not enough correlated data to proceed with the internal computations in the user's own local wireless device, additional data regarding the target remote wireless device in the form of signals received from the target remote wireless device and corresponding locations of the user's own local wireless device where the signals were received will be collected. Once the method determines that sufficient correlated data is available, the method may execute a step of applying a trilateration algorithm to obtain candidate geographic positions for the target remote wireless device. Once a plurality of candidate target positions for the target remote wireless device are determined, the method may execute a step of applying a filtering algorithm to obtain an accurate position for the target remote wireless device. The method may then execute a step in which the user's own local wireless device is caused to display and/or store the resolved accurate geographic position for the target remote wireless device along with the information by which to identify the target remote wireless device. Alternatively, the method may execute a step of causing the user's own local wireless device to transmit the accurate geographic position for the target remote wireless device, along with the information by which to identify the specific target remote wireless device for use by other applications or entities remote from the user's own local wireless device. These entities may include law enforcement agencies, other government agencies, security professionals and penetration testers who may use the information provided to locate unknown, rogue, or unauthorized wireless devices. The entities may otherwise include commercial vendors who could use the information in near real time to better advise users of their proprietary devices of more ideal locations to improve wireless reception on the users' wireless devices. These are only a few of the beneficial uses that may be realized through use of the systems and methods according to this disclosure. Overall benefits of the disclosed embodiments may include simple, practical and accurate geolocation of certain target remote wireless devices to any manner of beneficial purpose that may be realized through such a capability.

The above-described exemplary systems and methods referenced certain conventional components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

Embodiments may also be practiced in distributed computing environments where tasks are performed by local and remote processing devices that are linked to each other by hardwired links, wireless links, or a combination of both through a communication network. In a distributed computing environment, program modules may be located in both local and remote memory storage devices.

Embodiments within the scope of the present disclosure may also include computer-readable media having stored computer-executable instructions or data structures that can be accessed, read and executed by the user's local wireless device using a compatible wired or wireless data reader. Such computer-readable media can be any available media that can be accessed by a processor, general purpose or special purpose computer in, or in communication with, the user's local wireless device. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a user's local wireless device, or a processor in such a user's local wireless device, to perform certain of the above-specified functions, individually, or in combination. Computer-executable instructions also include program modules that are remotely stored for access by a user's local wireless device to be executed by processors in the user's local wireless device when that device is caused to communicate in a network environment. The exemplary depicted sequence of executable instructions or associated data structures represents one example of a corresponding sequence of acts for implementing the functions described in the steps.

Although the above description may contain specific details, they should not be construed as limiting the claims in any way. Other configurations of the described embodiments of the disclosed systems and methods are part of the scope of this disclosure. For example, the principles of the disclosure may be applied to each individual user where each user may individually deploy such a system. This enables each user to use the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for identifying a fixed location of at least one target wireless device, comprising:
    determining a first location of a receiving wireless device operated by a user;
    detecting passively, with the receiving wireless device, a signal from at least one target wireless device in a vicinity of the receiving wireless device;
    assigning, by a processor in the receiving wireless device, a value to a signal strength of the detected signal, the value being calculated by applying a log-distance path loss model;
    correlating the determined first location of the receiving wireless device with the value of the signal strength of the detected signal from the at least one target wireless device at the first location of the receiving wireless device to result in first correlated data;
    repeating the determining, detecting, assigning and correlating for a second location of the receiving wireless device and at least one third location for the receiving wireless device when the receiving wireless device is moved to the second location and to the at least one third location to result in second correlated data and at least one third correlated data;
    applying a trilateration algorithm, by the processor in the receiving wireless device, to the first correlated data, the second correlated data and the at least one third correlated data to determine a plurality of candidate fixed locations for the at least one target wireless device;
    applying a filtering algorithm, by the processor in the receiving wireless device, to the plurality of candidate fixed locations for the at least one target wireless device to identify a fixed location of the at least one target wireless device; and
    outputting the identified fixed location of the at least one target wireless device to the user of the receiving wireless device.

2. The method of claim 1, wherein all of the determining, detecting correlating, assigning, applying and outputting are accomplished autonomously by the receiving wireless device.

3. The method of claim 1, wherein the receiving wireless device receives a signal from a global positioning satellite system to determine the first location, the second location and the at least one third location.

4. The method of claim 1, wherein the receiving wireless device detects passively the signal from the at least one target wireless device via a Wi-Fi receiver in the receiving wireless device.

5. The method of claim 1, further comprising determining, by the processor in the receiving wireless device, whether sufficient correlated data is collected to apply the trilateration algorithm.

6. The method of claim 1, further comprising moving the receiving wireless device to at least another third location and repeating the determining, detecting, assigning and correlating steps for the at least the another third location to result in at least another third correlated data,
    wherein the trilateration algorithm is applied additionally to the at least the another third correlated data.

7. The method of claim 1, further comprising testing a range of path loss components.

8. The method of claim 1, wherein the calculated distance is a radius of a sphere and a correlated location of the receiving wireless device is a center point for the sphere for use in the trilateration algorithm for each location of the receiving wireless device.

9. The method of claim 1, wherein the filtering algorithm selects the candidate location with a smallest predicted error as the identified location of the at least one target wireless device.

10. The method of claim 1, wherein the identified location of the at least one target wireless device is output to the user of the receiving wireless device by being displayed on a display screen of the receiving wireless device.

11. The method of claim 1, wherein the receiving wireless device is a hand-held device.

12. The method of claim 11, wherein:
    the hand-held device is one of a smartphone, a tablet and a PDA, and
    the hand-held device is a stand-alone device for performing all of the steps of the method.

13. A receiving wireless device for identifying a fixed location of at least one target wireless device, comprising:
    a position reference device configured to determine a location of the receiving wireless device;
    an external data communication interface configured to receive wireless signals passively from the at least one target wireless device in a vicinity of the receiving wireless device;
    a storage device configured to store at least a trilateration algorithm and a filtering algorithm for execution;
    a processor that is programmed to
        assign a value to a signal strength of the signal received from the at least one target wireless device in a vicinity of the receiving wireless device, the value being calculated by applying a log-distance path loss model, correlate the location of the receiving wireless device with the assigned value of the signal strength of the signal received from the at least one target wireless device at the location of the receiving wireless device at which the signal is received to result in correlated data, apply the stored trilateration algorithm to a plurality of the correlated data to determine a plurality of candidate fixed locations for the at least one target wireless device, and apply the stored filtering algorithm to the plurality of candidate fixed locations for the at least one target wireless device to identify a fixed location of the at least one target wireless device; and an output device configured to output the identified fixed location of the at least one target wireless device to a user of the receiving wireless device, wherein the receiving wireless device is a hand-held device.

14. The receiving wireless device of claim 13, wherein the hand-held device is one of a smartphone, a tablet or a PDA.

15. The receiving wireless device of claim 13, wherein the position reference device is a global positioning satellite system receiver.

16. The receiving wireless device of claim 13, wherein the wireless signals passively received by the receiving wireless device from the at least one target wireless device are Wi-Fi signals.

17. The receiving wireless device of claim 13, the processor being further programmed to apply the calculated distance as a radius of a sphere with a correlated location of the receiving wireless device as a center point for the sphere for use in the trilateration algorithm for each location of the receiving wireless device.

18. The receiving wireless device of claim 13, the processor being further programmed to apply the filtering algorithm to select the candidate fixed location with a smallest predicted error as the identified fixed location of the at least one target wireless device.

19. The receiving wireless device of claim 13, further comprising a display screen, wherein the identified fixed location of the at least one target wireless device is output to the user of the receiving wireless device by being displayed on the display screen.

20. A non-transitory computer-readable medium storing instructions which, when executed by a processor in a receiving wireless device, cause the processor to execute a method for identifying a fixed location of at least one target wireless device, the method comprising:

determining a first location of the receiving wireless device operated by a user;

detecting passively, with the receiving wireless device, a signal from at least one target wireless device in a vicinity of the receiving wireless device;

assigning a value to a signal strength of the detected signal, the value being calculated by applying a log-distance path loss model;

correlating the determined first location of the receiving wireless device with the value of the signal strength of the detected signal from the at least one target wireless device at the first location of the receiving wireless device to result in first correlated data;

repeating the determining, detecting, assigning and correlating steps for a second location of the receiving wireless device and at least one third location of the receiving wireless device when the receiving wireless device is moved to the second location and to the at least one third location to result in second correlated data and at least one third correlated data;

applying a trilateration algorithm to the first correlated data, the second correlated data and the at least one third correlated data to determine a plurality of candidate fixed locations for the at least one target wireless device;

applying a filtering algorithm to the plurality of candidate fixed locations for the at least one target wireless device to identify a fixed location of the at least one target wireless device; and outputting the identified fixed location of the at least one target wireless device to a user of the receiving wireless device.

* * * * *